(12) United States Patent
Sakamoto et al.

(10) Patent No.: US 10,530,195 B2
(45) Date of Patent: Jan. 7, 2020

(54) NON-CONTACT POWER RECEIVING DEVICE

(71) Applicant: SUBARU CORPORATION, Tokyo (JP)

(72) Inventors: Takahiro Sakamoto, Tokyo (JP); Yukio Karasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 85 days.

(21) Appl. No.: 15/949,667

(22) Filed: Apr. 10, 2018

(65) Prior Publication Data

US 2018/0294683 A1 Oct. 11, 2018

(30) Foreign Application Priority Data

Apr. 11, 2017 (JP) ................................. 2017-078283

(51) Int. Cl.
*B60L 1/00* (2006.01)
*B60L 3/00* (2019.01)
(Continued)

(52) U.S. Cl.
CPC ............ *H02J 50/70* (2016.02); *H01F 27/365* (2013.01); *H02J 7/025* (2013.01); *H02J 50/12* (2016.02)

(58) Field of Classification Search
CPC ...... B60L 53/12; H01F 27/362; H01F 27/365; H01F 38/14; H02J 50/12; H02J 50/70;
(Continued)

(56) References Cited

U.S. PATENT DOCUMENTS

2013/0193749 A1* 8/2013 Nakamura ............... B60L 3/00
307/9.1
2013/0300359 A1* 11/2013 Nakamura ............ B60M 7/003
320/108
(Continued)

FOREIGN PATENT DOCUMENTS

| JP | 2014-226016 A | 12/2014 |
|----|---------------|---------|
| JP | 2015-186426 A | 10/2015 |
| JP | 2016-073080 A | 5/2016 |

OTHER PUBLICATIONS

Japanese Office Action, dated Oct. 9, 2018, in Japanese Application No. 2017-078283 and English Trnaslation thereof.
(Continued)

*Primary Examiner* — Rexford N Barnie
*Assistant Examiner* — Toan T Vu
(74) *Attorney, Agent, or Firm* — McGinn IP Law Group, PLLC

(57) ABSTRACT

A non-contact power receiving device includes a power receiving device, a shielding member, supports, a housing, and fastening elements. The power receiving device is mounted on a vehicle body and configured to receive wirelessly transmitted electric power. The shielding member is provided between the vehicle body and the power receiving device. The supports are provided so as to project from the vehicle body. The housing is provided between the supports and in which the power receiving device is disposed. The fastening elements are respectively mounted on the supports so as to be disposed on the opposite side of the housing and that respectively fasten the shielding member to the supports.

2 Claims, 5 Drawing Sheets

(51) Int. Cl.
    *H02G 3/00*     (2006.01)
    *H02J 50/70*    (2016.01)
    *H02J 7/02*     (2016.01)
    *H01F 27/36*    (2006.01)
    *H02J 50/12*    (2016.01)

(58) Field of Classification Search
    CPC .... H02J 7/025; H04B 5/0037; Y02T 10/7005; Y02T 90/122
    USPC ......... 307/9.1, 10.1, 104; 320/107, 108, 109
    See application file for complete search history.

(56) References Cited

U.S. PATENT DOCUMENTS

2015/0136499 A1*   5/2015   Ichikawa ................ B60L 53/12
                                                                             180/54.1
2016/0243948 A1*   8/2016   Asai ....................... B60L 50/64
2016/0355094 A1   12/2016   Yamakawa et al.

OTHER PUBLICATIONS

JPO Decision to Grant a Patent in JPA No. 2017-078283, dated Jan. 18, 2019 (English translation available on Dossier System).

* cited by examiner

NON-CONTACT POWER RECEIVING DEVICE

CROSS-REFERENCE TO RELATED APPLICATIONS

The present application claims priority from Japanese Patent Application No. 2017-078283 filed on Apr. 11, 2017, the entire contents of which are hereby incorporated by reference.

BACKGROUND

1. Technical Field

The present invention relates to a non-contact power receiving device that can receive wirelessly transmitted electric power.

2. Related Art

An instance of a non-contact power receiving device that can receive wirelessly transmitted electric power is described in Japanese Unexamined Patent Application Publication (JP-A) No. 2015-186426. The non-contact power receiving device described in JP-A No. 2015-186426 includes a recess provided on a bottom surface of a body of a vehicle, a power-receiving-side antenna coil unit disposed in the recess, and a first shielding plate made of a conductive material. The power-receiving-side antenna coil unit includes a first housing, a power-receiving-side resonance coil provided in the first housing, and a second shielding plate made of a magnetic material provided in the first housing. The first shielding plate made of a conductive material is mounted on the bottom surface of the vehicle.

A power-feeding-side antenna coil unit is provided on a ground. The power-feeding-side antenna coil unit includes a second housing, a power-feeding-side resonance coil provided in the second housing, and a third shielding plate made of a magnetic material provided in the second housing.

The non-contact power receiving device described in JP-A No. 2015-186426 uses the power-feeding-side resonance coil to generate a magnetic field, thereby transmitting electric power via the magnetic field. The power-receiving-side resonance coil receives the electric power transmitted via the magnetic field. The first shielding plate functions as an electromagnetic shield that shields against both an electric field and a magnetic field. In other words, the first shielding plate eliminates or reduces the effect of electromagnetic waves on the vehicle.

SUMMARY OF THE INVENTION

An aspect of the present invention provides a non-contact power receiving device including: a power receiving device mounted on a vehicle body and configured to receive wirelessly transmitted electric power; a shielding member disposed between the vehicle body and the power receiving device; supports that are provided so as to project from the vehicle body; a housing that is provided between the supports and in which the power receiving device is disposed; and fastening elements that are respectively mounted on the supports so as to be disposed on the opposite side of the housing and that respectively fasten the shielding member to the supports.

DETAILED DESCRIPTION

Figure 1:
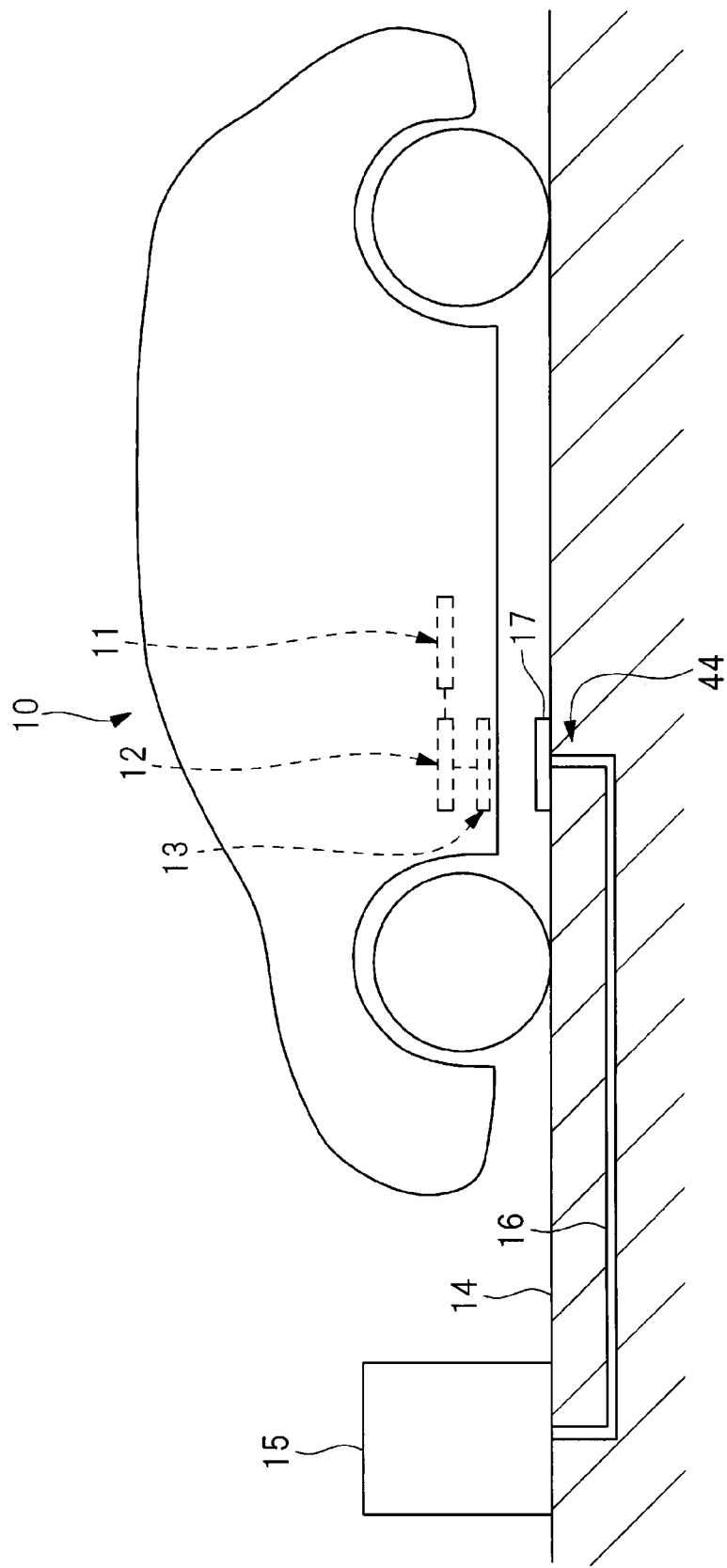
FIG. 1 is a schematic diagram of a vehicle provided with a non-contact power receiving device according to an example of the present invention.

An example of the present invention will be described below with reference to the attached drawings. Note that the following description is directed to an illustrative example of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

A fastening element for fastening to a vehicle body a shielding member that shields against electromagnetic waves is likely to be affected by electromagnetic waves.

It is desirable to provide a non-contact power receiving device that can eliminate or reduce the effect of electromagnetic waves on a fastening element that fastens a shielding member to a vehicle body.

A vehicle 10 illustrated in FIG. 1 is provided with an electric storage device 11, a rectifier 12, and a non-contact power receiving device 13. The electric storage device 11 is a DC power supply capable of performing charge and discharge operations. The electric storage device 11 includes a secondary battery and a capacitor. The secondary battery includes a lithium-ion battery and a nickel-hydrogen battery. The rectifier 12 is a device that converts AC into DC. The vehicle 10 is provided with an ancillary component and an electric motor for propelling the vehicle, both of which use electric power supplied from the electric storage device 11.

A ground 14 is provided with a control panel 15, a power cable 16, and a power transmitting device 17. The control panel 15 is coupled to a commercial power supply. The commercial power supply has a frequency of, for instance, 50 Hz or 60 Hz. The control panel 15 converts the frequency of the commercial power supply into the resonance frequency of the power transmitting device 17 and supplies a high-frequency electric current to the power transmitting device 17. The power transmitting device 17 has a coil and a magnet. The control panel 15, the power cable 16, the power transmitting device 17, and the non-contact power receiving device 13 constitute a non-contact power charging device 44.

Figure 2:
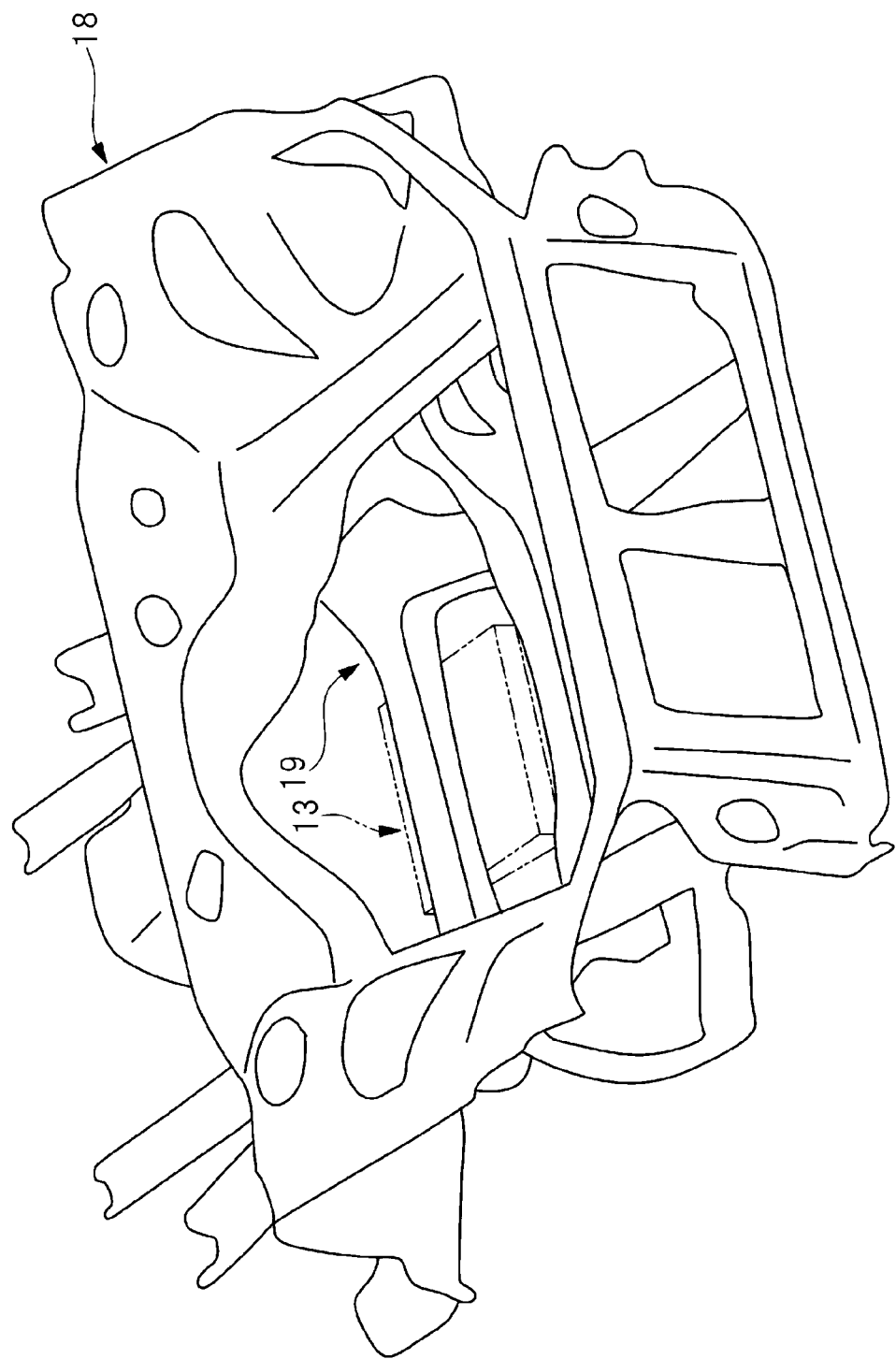
FIG. 2 is a perspective view illustrating a first vehicle body frame and a second vehicle body frame both of which are provided on the vehicle of FIG. 1.

The non-contact power receiving device 13 receives electric power wirelessly transmitted from the power transmitting device 17. The non-contact power receiving device 13 is mounted on the vehicle 10 as described below. As illustrated in FIG. 2, the vehicle 10 has a first vehicle body frame 18 and a second vehicle body frame 19 fastened to the first vehicle body frame 18. The first vehicle body frame 18 is made of metal and is disposed in the front section of the vehicle 10. In addition, the first vehicle body frame 18 is disposed so as to surround a motor compartment and is provided with a radiator, a shock absorber and the like.

Figure 3:
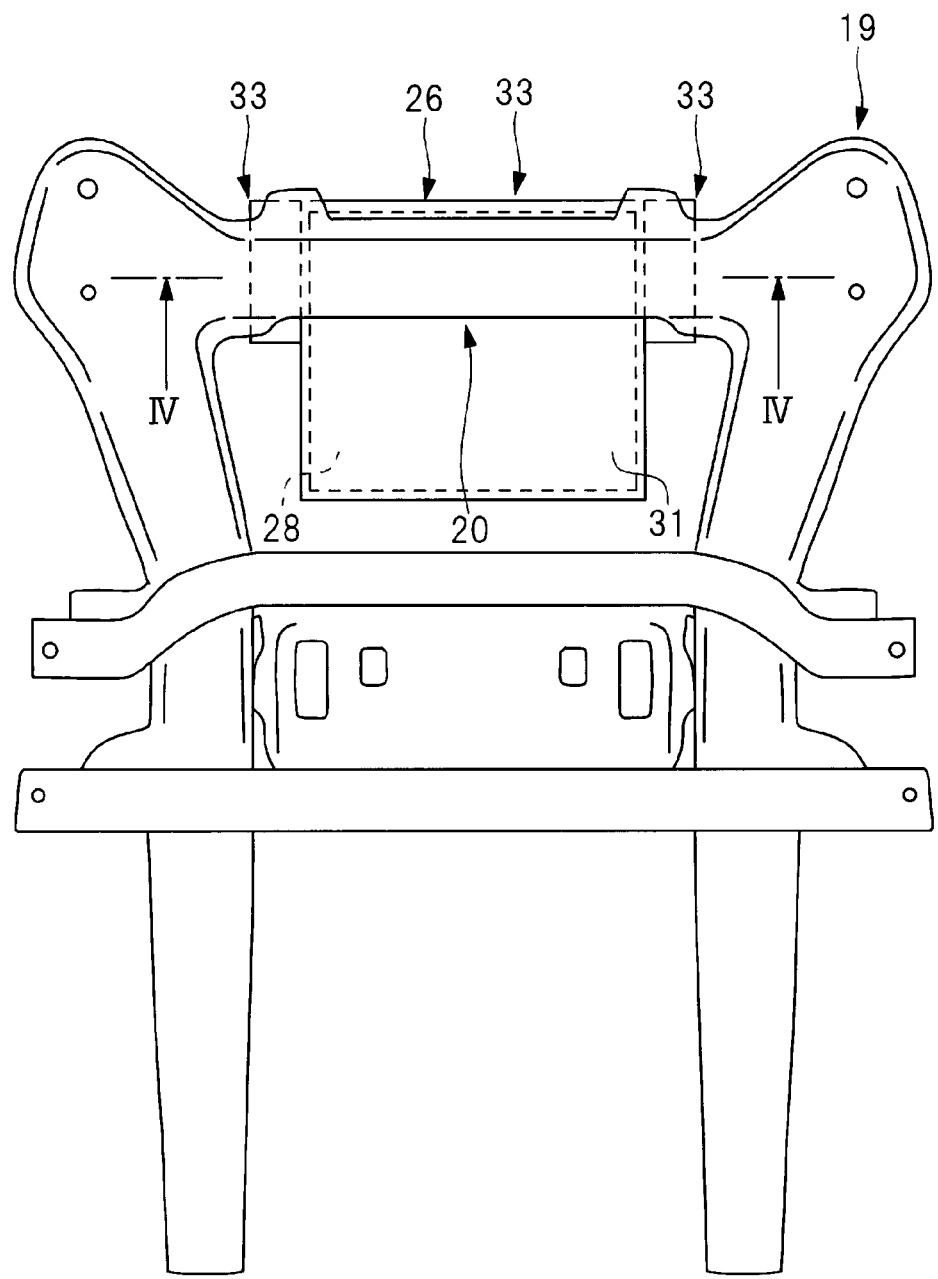
FIG. 3 is a plan view of the second vehicle body frame and a non-contact power receiving device.
Figure 4:
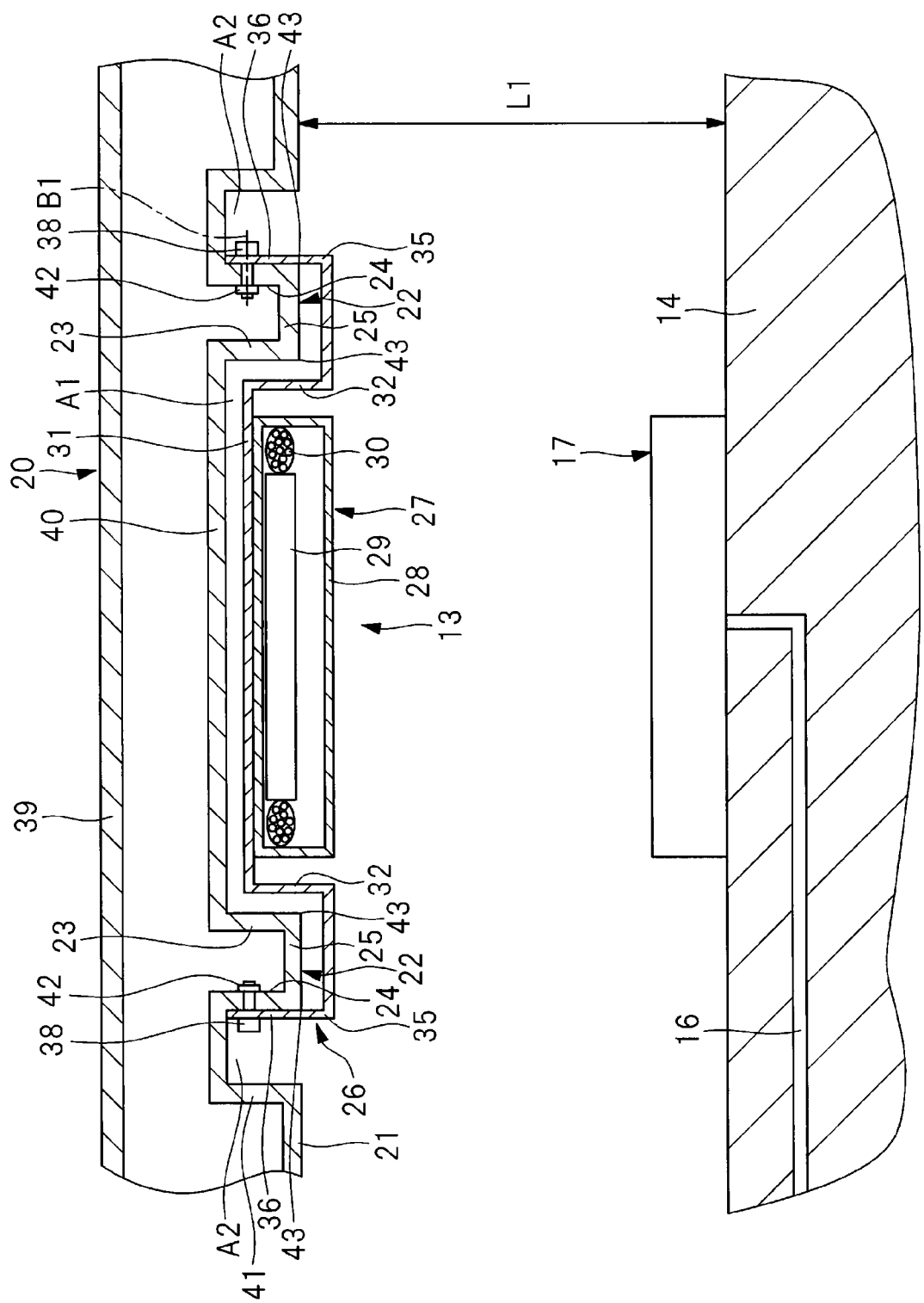
FIG. 4 is a longitudinal sectional view taken along line IV-IV of FIG. 3.

The second vehicle body frame 19 is made of metal or, for instance, iron, steel for machine structural use or the like. The second vehicle body frame 19 supports a motor. As illustrated in FIG. 3, the second vehicle body frame 19 has a cross member 20 disposed in the vehicle-width direction or the crosswise direction of the vehicle 10. The cross member 20 has a hollow structure that includes an upper wall 39, a lower wall 21, and an intermediate wall 40. The lower wall 21 is located below the upper wall 39. The intermediate wall 40 is located between the upper wall 39 and the lower wall 21. FIG. 4 illustrates an instance in which the upper wall 39, the intermediate wall 40, and the lower wall 21 are substantially horizontal. The intermediate wall 40 has a plurality of, more specifically, two supports 22. The two supports 22 are formed by causing portions of the intermediate wall 40 to project downward in the vertical direction of the vehicle 10.

The two supports 22 are disposed so as to be spaced apart from each other in the vehicle-width direction of the vehicle 10. As illustrated in FIG. 4, when the longitudinal section of the cross member 20 is viewed from the vehicle front, portions of the intermediate wall 40 are bent in a crank shape to form the two supports 22. Each of the supports 22 has a first wall 23, a second wall 24, and a third wall 25. The first wall 23 and the second wall 24 are parallel to each other and are perpendicular to the lower wall 21. The third wall 25 provides a connection between ends of the first wall 23 and the second wall 24. The third wall 25 is disposed so as to be equal in height to the lower wall 21. The two first walls 23 are disposed between the two second walls 24 in the vehicle-width direction of the vehicle 10. As described above, the cross member 20 is thick enough to ensure the rigidity of the second vehicle body frame 19 and is bent in a crank shape.

A recess A1 is formed between the two first walls 23. The two supports 22 project from the lower wall 21 to the same extent. The recess A1 is disposed between the two supports 22. Both ends of the intermediate wall 40 are coupled to the lower wall 21 via connecting walls 41. Spaces A2 are provided between the second walls 24 and the connecting walls 41. The two second walls 24 have nuts 42 welded to inner surfaces thereof.

The non-contact power receiving device 13 is mounted on the cross member 20 and has a shielding member 26 fastened by the two supports 22 and a power receiving unit 27 mounted on the shielding member 26. The power receiving unit 27 has a housing case 28 made of an insulating material, a ferrite magnet 29, and coils 30, the ferrite magnet 29 and coils 30 being provided in the housing case 28. The insulating material may include synthetic resin. As illustrated in FIG. 3, in a plan view of the second vehicle body frame 19, the housing case 28 is quadrilateral, more specifically, rectangular or square. The coils 30 are formed of metallic wires wrapped around a ferrite magnet 29 and are electrically coupled to the electric storage device 11 via the rectifier 12.

Figure 5:
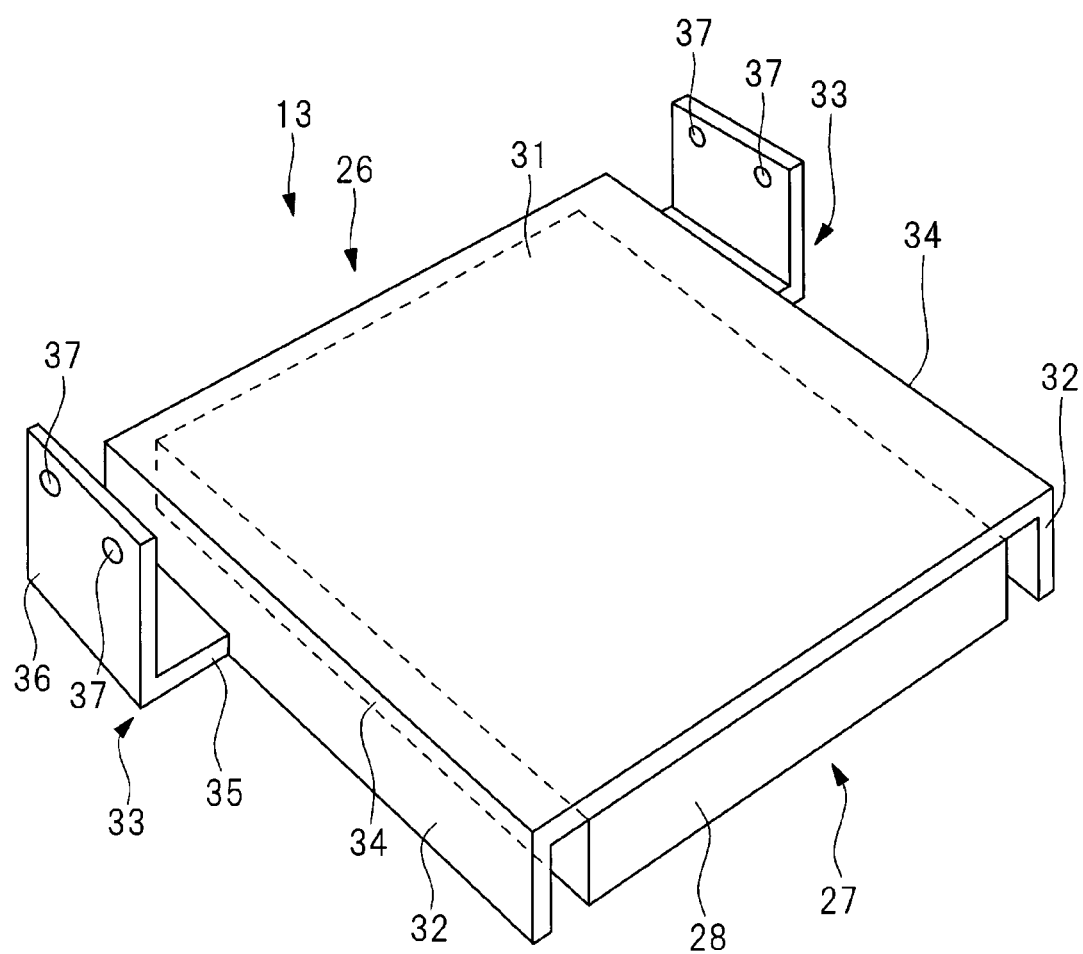
FIG. 5 is a perspective view of the non-contact power receiving device.

The shielding member 26 is formed of a metallic plate, for instance, an aluminum plate. As illustrated in FIG. 5, the shielding member 26 has a quadrilateral board 31, two side plates 32 coupled to the board 31, and two arms 33 provided respectively on the two side plates 32. The housing case 28 is mounted on the lower surface of the board 31. The board 31 has two edges 34 that are parallel to each other. The two edges 34 are disposed in the longitudinal direction of the vehicle 10. The two side plates 32 are coupled to the two respective edges 34. The arms 33 have projecting pieces 35 projecting laterally from the side plates 32 and supporting pieces 36 extending upward from the projecting pieces 35. The projecting pieces 35 are parallel to the board 31. The two projecting pieces 35 project from the side plate 32 so as to be apart from each other. The supporting piece 36 has through-holes 37 passing therethrough.

As illustrated in FIG. 4, bolts 38 are inserted into the through-holes 37 and tightened, thereby fastening the shielding member 26 to the two supports 22. With the shielding member 26 fastened to the two supports 22, the shielding member 26 is disposed between the power receiving unit 27 and the cross member 20 so as to cover the power receiving unit 27. The bolts 38 are mounted in the second walls 24 that are on the opposite side of the recess A1 across the first walls 23 in such a manner as to be perpendicular to the direction in which the supports 22 extend from the intermediate wall 40. In addition, the bolts 38 are disposed in such a manner that their center line B1 is perpendicular to the direction in which the supports 22 extend from the intermediate wall 40. The two arms 33 are bent so as to avoid contact with the two respective supports 22. As described above, the shielding member 26 is fastened to the cross member 20 with the bolts 38 at two locations of installation provided in the vehicle-width direction of the vehicle 10. The bolts 38 are composed of metal of a magnetic material, for instance, carbon steel for machine structural use or alloy steel for machine structural use.

With the shielding member 26 fastened to the cross member 20, the board 31 and part of the side plates 32 are disposed in the recess A1. The projecting pieces 35 are disposed below the third walls 25. The two supporting pieces 36 are in contact with outer surfaces of the two respective second walls 24. The distance between a lower surface of the lower wall 21 and lower surfaces of the projecting pieces 35 is the same as the distance between the lower surface of the lower wall 21 and a lower surface of the housing case 28. The two supporting pieces 36 are partly disposed in the respective spaces A2. As illustrated in FIG. 4, the shielding member 26 is shaped to suit a surface profile of the cross member 20. In addition, heads of the bolts 38 are disposed in the spaces A2. Furthermore, part of the power receiving unit 27 is disposed in the recess A1.

In the non-contact power charging device 44 according to the example of the present invention, the control panel 15 supplies a high-frequency electric current to the power transmitting device 17 where a magnetic field is generated by the coil of the power transmitting device 17. The magnetic field passes through the coils 30 which in turn generate an electric current. The electric current generated in the coils 30 charges the electric storage device 11 via the rectifier 12. As described above, the non-contact power charging device 44 according to the example of the present invention uses an electromagnetic induction system to transmit or receive electric power.

The non-contact power receiving device 13 according to the example of the present invention has the conductive shielding member 26 provided between the power receiving unit 27 and the vehicle body. This arrangement can shield against both an electric field and a magnetic field generated by the coils 30, thereby eliminating or reducing the effect of a high-frequency magnetic field on the first vehicle body frame 18 and the second vehicle body frame 19.

Part of the power receiving unit 27 is disposed in the recess A1. In addition, the supports 22 are provided between the bolts 38 and the power receiving unit 27 in the vehicle-width direction of the vehicle 10. With this arrangement, when a magnetic field is generated in the power receiving unit 27, the magnetic flux is shielded against by the supports 22 and is less likely to reach the bolts 38. Accordingly, heating of the bolts 38 by the magnetic flux can be eliminated or reduced.

Furthermore, a height L1 from the ground 14 to the lower wall 21 can be understood as a minimum ground clearance of the vehicle 10. In addition, part of the housing case 28 is disposed in the recess A1. With this arrangement, the extent to which a lower end of the housing case 28 projects from the lower wall 21 can be reduced as much as possible. In other words, a reduction in the minimum ground clearance can be prevented or reduced. In addition, a lower surface of the first vehicle body frame 19 can be made as flat as possible. Furthermore, the coils 30 can be disposed above the minimum ground clearance. Consequently, this arrangement can eliminate or reduce the possibility for stones, splashing water, or other objects from the ground to contact with the housing case 28.

In addition, part of the power receiving unit 27 is disposed in the recess A1, thereby preventing a reduction in the minimum ground clearance. Consequently, right-angled corners 43 of the supports 22 and the coils 30 are disposed so as to be close to each other in the vertical direction of the vehicle 10. The right-angled corners 43 are boundaries between surfaces of the first walls 23 and surfaces of the third walls 25 and boundaries between surfaces of the second walls 24 and surfaces of the third walls 25. However, the shielding member 26 is provided between the power receiving unit 27 and the supports 22. This arrangement eliminates or reduces heating of the right-angled corners 43 of the supports 22 by magnetic flux. In addition, the two side plates 32 are disposed on the side of the coils 30, thereby reducing radiation of electromagnetic waves.

The cross member 20 is an example of a vehicle body part. The power receiving unit 27 is an example of a power receiving device. The recess A1 is an example of a housing. In addition, the second walls 24 are an example of "a component on the opposite side of the recess". The bolts 38 are an example of a fastening element.

The non-contact power receiving device according to the example of the present invention is typically described with reference to, but not limited to, the foregoing embodiment. Needless to say, various modifications are conceivable within the scope of the present invention. A shielding member, for instance, is fastened to a vehicle body frame at two different locations in the vehicle-width direction of a vehicle, but the shielding member may be fastened to the vehicle body frame at three or more locations. In addition, the vehicle body frame may have female thread holes corresponding to shafts for the bolts. Furthermore, the shielding member may be fastened to the vehicle body frame at two or more locations in the longitudinal direction of the vehicle.

In addition, the non-contact power receiving device includes a device in which the shielding member is fastened to the vehicle body frame provided with stud bolts by tightening nuts on the stud bolts. For instance, in FIG. 4, the stud bolts are provided in the second walls 24, while the nuts are disposed in the spaces A2 of FIG. 4. In this case, the stud bolts and the nuts are an example of the fastening element.

Furthermore, a frame that fastens a shielding member may be disposed at either one of the front and rear sections of a vehicle. In addition, the shielding member may be mounted directly on a vehicle body without the frame therebetween. In addition, the non-contact power receiving device according to the example of the present invention can be used for a system that wirelessly transmits electric power by using magnetic resonance, annular solenoids, in addition to the electromagnetic induction described above.

The example of the present invention can eliminate or reduce the effect of electromagnetic waves on a fastening element that fastens a shielding member to a vehicle body.

The invention claimed is:
1. A non-contact power receiving device comprising:
a power receiving device mounted on a vehicle body and configured to receive wirelessly transmitted electric power;
a shielding member disposed between the vehicle body and the power receiving device;
supports that are provided so as to project from the vehicle body, and spaced apart from each other in a first direction that intersects a direction in which the supports project from the vehicle body;
a storage portion in which the power receiving device is disposed; and
fastening elements that respectively fasten the shielding member to the supports, wherein
the supports include first walls that project from the vehicle body and are spaced apart from each other in the first direction, and second walls that project from the vehicle body and are spaced apart from each other in the first direction,
the two first walls are disposed between the two second walls in the first direction,
the storage portion is disposed between the two first walls,
the shielding member includes:
a board that is disposed in the storage portion and on which the power receiving device is mounted; and
two arms that are coupled to the board, extend from the storage portion, and are bent along the support,
the fastening elements fasten the two arms to the two second walls respectively, and
the supports are respectively disposed between the fastening elements and the power receiving device.
2. The non-contact power receiving device according to claim 1,
wherein the fastening elements each include a bolt; and
wherein a center line of the bolt is perpendicular to the direction in which the supports project from the vehicle body.

* * * * *